United States Patent [19]
deCaussin

[11] 3,955,267
[45] May 11, 1976

[54] ATTACHMENT FOR AUTOMATING MILLING MACHINES

[75] Inventor: David Edward deCaussin, Northridge, Calif.

[73] Assignee: Fadal Engineering Company, Inc., North Hollywood, Calif.

[22] Filed: Aug. 26, 1974

[21] Appl. No.: 500,441

[52] U.S. Cl................................ 29/568; 211/1.5; 408/3; 408/35
[51] Int. Cl.² ........................................ B23Q 3/157
[58] Field of Search .............. 29/568, 26 A; 408/3, 408/8, 9, 11, 35; 211/1.5

[56] References Cited
UNITED STATES PATENTS

| | | | |
|---|---|---|---|
| 3,143,900 | 8/1964 | Oeckl et al. ................... | 408/8 X |
| 3,161,951 | 12/1964 | Anthony ........................ | 29/568 |
| 3,691,655 | 9/1972 | Kurimoto et al. ............. | 29/568 |

Primary Examiner—Willie G. Abercrombie
Assistant Examiner—Z. R. Bilinsky
Attorney, Agent, or Firm—Singer & Singer

[57] ABSTRACT

An improved portable bracket assembly capable of being attached to a milling machine to thereby allow a plurality of sequentially located tool holders to be selected and inserted into the spindle of the milling machine. A special camming device containing a plurality of settable cams, one for each tool holder, and synchronized with the movement of said tool holders, controls selected switches. The presettable cams allow the first switch to continuously engage the indexing means driving the tool holders should a tool holder not contain a cutting tool. The resettable cams also control a second switch mechanism for creating a specific tool speed control signal for the specific tool in each tool holder.

2 Claims, 10 Drawing Figures

| | |
|---|---|
| 1 | SKIP |
| 2 | INCREASE RPM |
| 3 | SAME RPM |
| 4 | DECREASE RPM |

ATTACHMENT FOR AUTOMATING MILLING MACHINES

This invention relates to a portable attachment for use with a conventional milling machine and more specifically to an attachment assembly having the capability of allowing a conventional milling machine to sequentially select a plurality of tool holders to perform a complete machining operation on a workpiece without intervention from a human operator.

In the art of numerically controlled machine tools it is well known to use a numerical control tape driven device in combination with a milling machine to perform repetitive production maching operations. The principle of the numerical controller requires the programming of a tape and establishing of a home position on the worktable holding the workpiece. The first cutting operation is programmed to start from the home position and to then follow a torturous path during the cutting operation dictated by the shape of the piece and the desired outcome. The first cut is programmed to end at the home position, at which time the tape is programmed to stop the machine and allow the operator to remove the first cutting tool and insert the next cutting tool.

Depending on the complexity of the workpiece which for example may be a cam requiring possibly 30 different tools to complete the finished operation the tape is programmed to each of the sequential 30 different operations. Each program is complete for a given tool as to rate of cut, depth of cut, path being traversed. There are available in the field today a wide variety of numerical control programmers for use with different machine tools. Most of the larger machine tool manufacturers also sell complete packages which include the machine tool and a numeric control means which thereby allows the buyer a wide selection of machine tools and numerical control devices.

A most significant advance in the field of automatic machine tool operations occurred when the major machine tool manufacturers perfected and made available to the industry a complete numerically controlled machining center. The machine center provides in one master installation a milling machine having the capability of holding a plurality of tool holders and means for automatically and sequentially selecting the individual tool holder in accordance with the work requirements of the individual workpiece. The machine center is under the control of a numerical controller which provides the user with the capability of manufacturing a complex workpiece by one machine from start to finish and all under the control of a single numerical controller.

Machine centers of the type just described are presently available from the Kearney and Tracker Corporation of Milwaukee, Wisconsin, and the Gordon Machine Corporation of Racine, Wisconsin. U.S. Pat. No. 3,613,224, issued Oct. 19, 1971, to R. F. Newton, et al, and entitled Machine Tool, is an example of one machine center.

These machine centers are undoubtedly extremely powerful and useful machines for manufacturing high production repetitive items, however, the cost of such machines is in the hundreds of thousands of dollars and hence not available to the small machine operator.

This invention is concerned with improvements to a portable attachment capable of being moved from machine to machine and attached to a conventional milling machine having the capability of being controlled by a numerical controller. The attachment works in conjunction with the milling machine and the numerical controller and provides the basis for individually selecting up to 12 different tool holders which can be individually and sequentially programmed to be inserted into the spindle of the cutting machine and automatically removed when the cutting operation for that cutting tool is finished as determined by the numerical controller. The complete operation is automatic and sequential and does not require intervention of the operator other than to start the machine when the workpiece is inserted and then stop the machine and remove the workpiece when all the operations are completed.

In other words, this invention allows a conventional milling machine of the type that costs approximately $20,000.00 to now have the capability with the disclosed portable attachment of performing sequential operations presently available only with machines costing almost ten times that figure. In addition, the attachment is a true separate attachment and does not become part of the machine but may be removed and placed on different machines as the needs of the business dictate. It then becomes obvious that cost and savings to the small machine shop operator are enormous since he only has to invest in the basic milling machine and those adaptors as required by the needs of his business.

In the conventional milling machine of the type manufactured by the Bridgeport Company, the tool holder is held in the spindle by a rod extending through the spindle to the top of the drive mechanism where it is terminated by a locking nut. In the normal operation of changing tool holders the operator must first stop the spindle then loosen the locking nut which allows the tool holder to be removed. A new tool holder is then inserted and the lock nut tightened to maintain the tool holder within the spindle for the next operation.

In order to practice the present invention it is desirous to automate the insertion and removal of the tool holder into the spindle. In one embodiment an impact wrench operated either by an electrical motor or an air motor is connected to the top of the machine over the locking nut which either tightens or loosens the spindle depending on the direction of rotation of the impact motor. In one embodiment a conventional impact tool motor operated by air is connected to the locking nut with two separate air lines controlled by a valve which allows the operator to energize the motor in one direction to tighten or in the alternative to energize the motor in the opposite direction to loosen the spindle. The impact tool motor is preferably permanently connected to each of the individual milling machines for use by the operator when individually changing tool holders.

In the preferred embodiment a new and improved impact wrench is used. The end of the draw bar is splined and an axially movable spindle having matching splines and rotated by the impact wrench is caused to move axially into contact with the splined draw bar when either tightening or loosening individual tool holders to the drive spindle. When not in use a compression spring causes the axially movable splined spindle to be disengaged from the splines on the draw bar. Specific details of the new and improved draw bar are disclosed in my co-pending application entitled A Remotely Operated Draw Bar Tool Changer, filed Aug. 26, 1974 and assigned Ser. No. 500,443 now U.S. Pat. No. 3,898,911.

It will be apparent to those skilled in the art that the invention may be practiced by using different sources of power such as hydraulic, electrical or pneumatic power to drive the indexing means, the transfer arm, or the impact tool motor.

The present invention represents an improvement over my original application entitled A Removable Attachment for Automating Milling Machines, filed Feb. 2, 1973, Ser. No. 329,111, which discloses and claims the basic concepts of a portable attachment.

In the present invention the index table has been replaced with a chain and sprocket device in which the individual tool holders are held in brackets fixedly attached to an endless chain. The chain in turn is driven by an indexing means that is adapted to move the individual tool holders sequentially past a given homing position.

In order to achieve the economic benefits of the present invention it is only necessary to use portable numerical controllers that are presently available on the market. These portable controllers have a limited number of commands available from the programmed tape transport mechanism and the present improvement provides means for obtaining additional commands even though the numerical controller is limited in command ability.

For example, a novel cam assembly synchronized with the indexing means and containing a separately controllable cam for each tool holder position is attached to and synchronized to the indexing control.

Each cam is separately adjustable and caused to operate a pair of independently controllable switches. One of the switches is in circuit with the indexing control and is separately selectable by a given position of the settable cam to continuously operate the indexing control in the event that a tool holder position is not being used. The operation is equivalent to having a command from the numerical controller indicating that the individual tool holder should be skipped. In view of the limited capacity of the portable numerical controllers being used, the individual command is obtainable by the settable cam synchronized to the indexing control.

A spindle speed change function is usually available from the conventional numerical controllers, however, it is only the larger numerical controllers that are capable of generating a speed increase or a speed decrease command together with the feedback controls for indicating a stop function to se the spindle speed controller at the preset speed.

In the present invention the presettable cams operating on the second switch circuit are used to change and control the spindle speed control motor. For example, in the present invention a speed change function issued by the numerical controller is always interpreted as a command to increase the spindle speed. The individual settable cams are then set to allow the increased speed command from the numerical controller to increase the speed control or the cam will operate a switch for picking up a relay that reverses the signal to reduce the speed set on the speed control.

The speed control contains a cam having a plurality of cammable positions, one for each speed position required by the individual tools. As the speed control cam reaches a preset speed a switch is operated causing the numerical controller to stop sending a command signal to the speed control. Depending on the actual speeds required for the individual tool being used, it may be necessary to program additional sequential speed control signals from the numerical controller to the speed control until the desired speed for that particular tool is reached.

Further objects and advantages of the present invention will be made more apparent by referring now to the accompanying drawings wherein.

Figure 1:
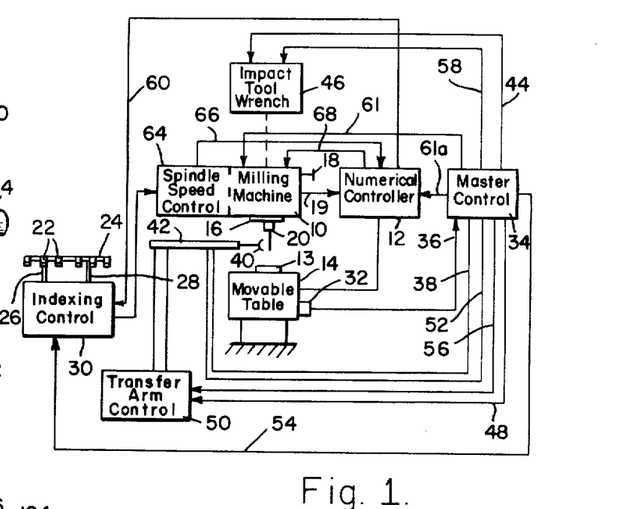
FIG. 1 is a block diagram illustrating the interactions between the portable attachment and the milling machine.

Referring now to FIG. 1, there is shown a block diagram illustrating the functions performed by the portable attachment in moving tool holders from the indexing chain to the spindle of a milling machine and return.

The foregoing description is made in connection with a pneumatic control system as the primary control power and in conjunction with a numerical controller and a milling machine. It will be appreciated by those skilled in the art that the portable attachment may be used in connection with any kind of cutting machine and is not necessarily limited to a milling machine. The embodiment built and tested used pneumatic power, however, it will be appreciated that any source of power, such as electrical power or hydraulic power may be used to perform the functions to be described.

Referring now to FIG. 1, there is shown a functional layout of the operating characteristics of the portable attachment and the interconnections between a conventional milling machine and a numerical controller. For example, a milling machine 10 is connected to a numerical controller 12 of the type that is tape controlled for moving a movable table 14 from a home position through a torturous path and return to the home position.

In the normal operation the operator loads the numerical controller 12 with a tape for performing a specific series of operations on a workpiece 13 such as a cam located on the worktable 14. The individual tape formed as part of the numerical controller is prepared specifically for the individual tools needed to create the finished workpiece and contains all the information needed to perform the operation on the workpiece and which includes information regarding spindle speed required by the necessary tool. The so-called portable numerical controllers have the capability for issuing a speed change control but do not necessarily indicate whether the speed should be increased or decreased.

The operator starts the spindle 16 by depressing the spindle start switch 18 associated with the milling machine 10. Depressing the switch 18 also starts the numerical controller 12 through line 19. With a given tool holder 20 located in the spindle 16 of the milling machine 10 the numerical controller 12 through line 21 controls the movable table 14 which starts at a fixed home position and moves the movable bed 14 from the home position through a predetermined path and back to the home position, at which time the spindle is stopped.

The present invention provides a plurality of brackets 22 physically attached to an endless chain 24 riding on a pair of sprockets 26 and 28.

The individual tool holders 20 are located sequentially and in an ordered relationship on the plurality of brackets 22 attached to the chain. Sprocket 28 is controlled by an indexing control 30 in order to move the chain 24 a given distance past a home position to thereby provide accessibility for selection of the individual tool holder.

Pressing the manual spindle start push button 18 starts the rotation of spindle 16 and the numerical controller 12 through line 19. The first tool holder 20 in the ordered relationship may either be inserted manually into the milling machine 10 or the program associated with the numerical controller 12 can select the first tool holder for insertion into the spindle 16.

With the movable table 14 in the home position, a position limit switch 32 is closed and a master controller 34 is energized through line 36.

The master control 34 controls the sequence of moving the tool holder 20 from the spindle 16 back to the bracket 22 for selecting a new tool holder for insertion into the spindle. With the master controller 34 energized, the following sequential acts are performed.

The master controller 34 energizes line 38 to close the open jaws 40 located on the transfer arm 42 since the normal position of the transfer arm is with the jaws 40 open and located in a position close to the spindle 16.

Line 44 is energized to control the impact tool wrench 46 to unlock the tool holder 20 from the spindle 16 which is now held by the jaws 40. Line 48 connected to the transfer arm control 50 is energized to move the transfer arm 42 from the spindle 16 to the bracket 22. This movement requires a complex movement in three planes in order to clear the tool holder 20 from the spindle 16, rotate the jaws 40 holding the tool 180° and at the same time translate the tool holder from the spindle to the bracket 22 and place the tool holder into the bracket attached to the indexing chain 24.

With the movement completed and the tool holder 20 located in the bracket 22, the master control 34 energizes line 52 which opens the jaws 40. The indexing control 30 is energized through line 54 which indexes the indexing chain 24 to the next tool holder 20 at which time the indexing chain is automatically locked and held in position by the indexing control. Line 38 is energized to close the jaws 40 about the next tool holder 22. The transfer arm control 50 is energized by line 56 from the master control 34 to reverse the function of the transfer arm 42 which is to remove the tool holder 20 from the bracket 22 to the spindle 16 while at the same time rotating the jaws 40 with the tool holder 180°. The tool holder is continuously and in the same motion inserted into the spindle 16 of the milling machine 10.

Line 58 connecting the impact wrench 46 with the master control 34 is energized to thereby lock the tool holder 20 in place in the spindle 16. Line 52 which controls the opening of the jaws 40 is energized to release the tool holder 20.

According to the teachings of the present invention, the numerical controller generates a speed change command in accordance with the spindle speed requirements for the next tool in sequence. This command is programmed by the operator and is encoded in the tape driving the numerical controller 12. If there is no speed change between selected tool holders, then no signal will be generated. In the event there is a speed change command the signal will appear on line 60 and fed to a special cam assembly associated with the indexing control 30.

The master control 34 energizes line 61 which is connected to the milling machine 10 for starting the spindle 16. The last step in the sequence is the energizing of line 61A which causes the numerical controller 12 to operate. The programmed tape associated with the numerical controller 12 starts the spindle 16 of the milling machine 10 by means of line 68.

All speed change command signals emanating on line 60 are immediately interpreted as an increase in spindle speed and it is the function of the cam assembly to program the speed increase command signal into a decrease command or to apply it as an increasing speed command signal to the spindle speed control 64 associated with the milling machine 10.

The spindle speed control 64 is programmed to generate a signal on line 66 feeding the numerical controller 12 to indicate that a preselected speed has been reached. The tape associated with the numerical controller 12 will be properly programmed to reinstitute the speed control signal until the desired speed preset for that selected tool is reached.

With the spindle 16 rotating at the proper spindle speed the numerical controller 12 moves the workpiece 13 from the home position through the torturous path as defined by the taped program for the next tool in the tool holder 20. The complete sequence will again repeat itself with the numerical controller 12 placing the movable table 14 in the home position and the closing of the spindle 16. Switch 32 will again energize the master control 34 to begin the sequence of operation which begins with the energizing of line 36 to close the jaws 40 about the tool holder 29. The complete sequence of operation then repeats itself until all of the tool holders located on the indexing chain 24 have been used and returned.

Figure 2:
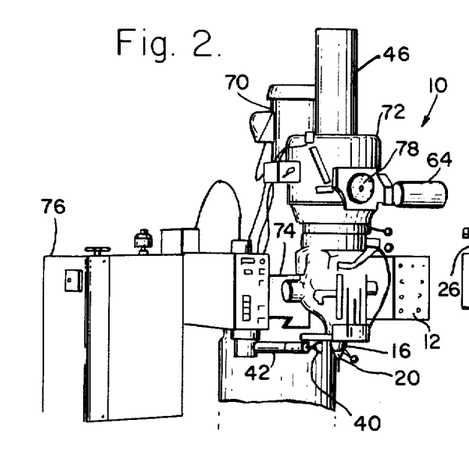
FIG. 2 illustrates a milling machine with a portable attachment located in place.

Referring now to FIG. 2, there is shown a conventional milling machine 10 having a spindle drive motor 70, gear housing 72, located on a spindle carrige 74 adapted to move in a fore and aft direction on suitable guides not illustrated. The portable attachment 76 is attached to the spindle carriage 74 and is adapted to move in a fore and aft direction as the spindle assembly moves.

The transfer arm 42 is illustrated in the normal position with the jaws 40 in the open position near the tool holder 20. The intitial position of the portable attachment 76 on the carriage 74 is determined primarily by the positioning of the jaws 40 on the transfer arm 42 since the jaws must be in the position when energizing to grasp the tool holder 20 when located within the spindle 16.

Located on the face of the milling machine 10 is a spindle speed control 64 adapted to change the spindle speed 16 and at the same time rotate a speed cam indicator 78. The speed cam indicator 78 has the dual function of indicating the selected speed for the individual tool located in the spindle 16 and also to generate a stop signal which is fed back to the numerical controller in the presence of a speed change command. Further explanation and illustration of the speed cam indicator 78 will be made in connection with FIG. 7 and FIG. 8.

Referring now to FIGS. 3, 4, 5 & 6, there is shown in greater detail portions of the indexing chain 24 rotating about and driven by sprockets 26 and 28. In the preferred embodiment, sprocket 28 is driven by the indexing control 30 which is more fully illustrated in FIG. 9.

Figure 3:
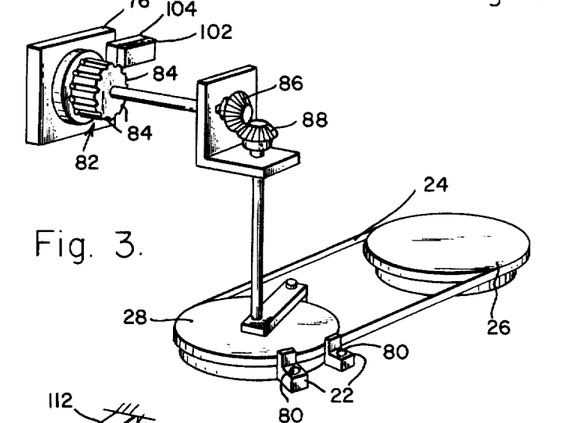
FIG. 3 illustrates the endless belt holding the plurality of tool holders and the cam assembly synchronized to the tool holders.

Located on the outside of the indexing chain 24 is a plurality of brackets 22 having an opening 80 for accepting the individual tool holders 20. The total number of brackets is a function of the needs of the customer and hence the size of the portable attachment 76 illustrated in FIG. 2. In the embodiment being described there are 12 brackets 22 located on the indexing chain 24. The individual tool holders 20 are inserted in the individual brackets 22 in an ordered relationship and in a sequence determined by the operations to be performed upon the workpiece 13. The tape associated with the numerical controller 12 is programmed in accordance with the tools being used and the order in which the tools are to be selected by the transfer arm 40.

The present invention provides a skipping operation in the event less than the total available tools are used. For example, in the 12 tool holder capacity machine it may be desirable to complete the operation on the workpiece utilizing only eight different tools. However, the portable numerical controllers do not have the expanded command capability of issuing a skip command and as a result there is provided a cam assembly 82 associated with the portable attachment 76 that can be preset to indicate the absence of a tool holder at a given home position and to indicate to the indexing control 30 that the selected position should be skipped and the indexing chain moved to the next position.

The cam assembly 82 comprises a plurality of individual insertable cams 84, one for each tool holder bracket 22 attached to the indexing chain 24. The cam assembly 82 is mounted on one wall of the portable attachment 76 and is adapted to be rotated through right angle drive gears 86 and 88 directly from sprocket 28 which also drives the indexing chain 24. In this manner the cam assembly 82 is in a direct timing relationship with the individual tool holder brackets 22 as they are moved by the indexing control 30.

The periphery of the cam assembly 82 therefore contains 12 individual cam inserts 90 having a plurality of camming surfaces 92 and selected flat portions 94 and 94a.

The cam assembly 82 is constructed in the form of a disc having 12 openings 96 located along the periphery of the cam assembly 82 and each adapted to receive an individual cam insert 90. The outside diameter 98 of the cam assembly 82 has a diameter that is small enough to expose a portion of the opening 96 but large enough so that the individual cam inserts 90 are held captive within the opening 96. The selection of the diameter 98 thereby exposes a portion of the camming surface 92 associated with the cam inserts 90.

The cam inserts 90 are provided with a controllable opening 100 in the form of a hexagon to thereby allow the use of a hexagon wrench for rotating the cam insert 90 to some predetermined and selectable position. A review of FIGS. 4 and 5 will show that cam inserts 90 may be rotated so that flat portion 94 or 94a is aligned with the diameter 98 and hence presents no external surface for camming purposes. On the other hand, rotating the cam insert 90 so as to place the camming surface 92 against the diameter 98 will produce an external surface from the cam insert allowing the camming surface 92 to be used as a control for operating externally mounted switches.

Figures 4, 5, 6:
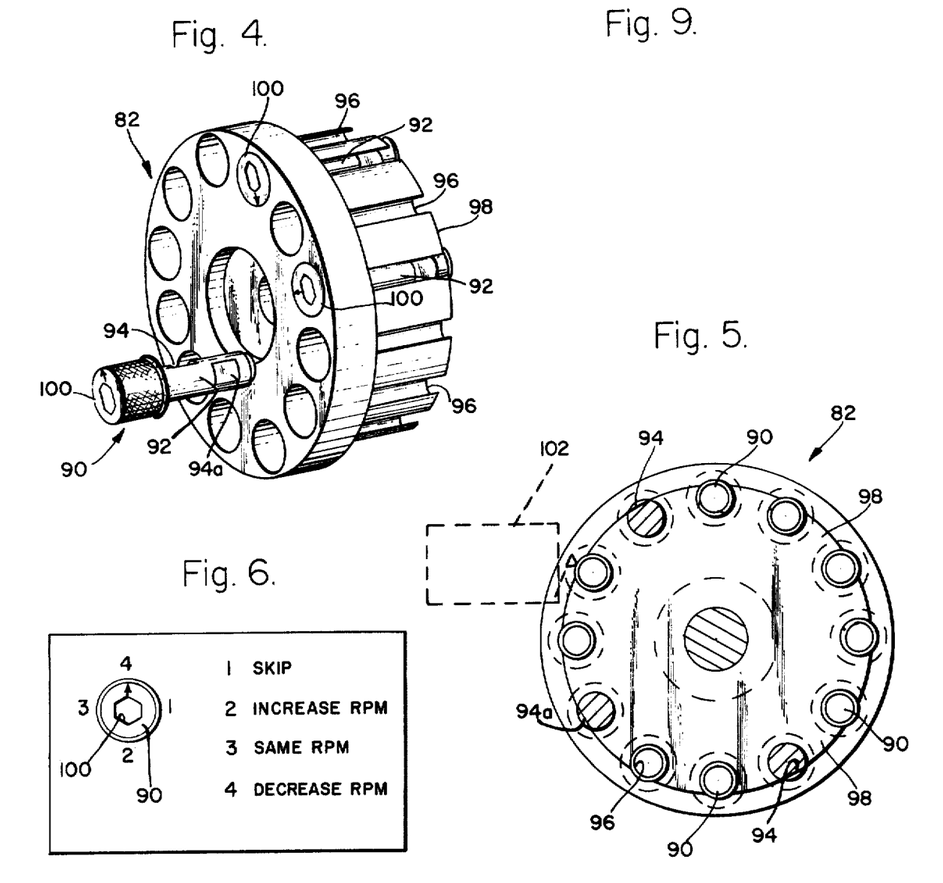
FIG. 4 is a perspective view of the cam assembly illustrating the individual cams, one for each tool holder.
FIG. 5 is a rear view of the cam assembly illustrated in FIG. 4.
FIG. 6 illustrates a nameplate panel for adjusting the individual cams comprising the cam assembly of FIGS. 4 and 5.

The individual cam inserts 90 are long enough so that two separate switches 102 and 104 are separately controllable depending upon the rotation of the individual cam inserts 90. Switch 102 is used in connection with the skipping operation in the event an individual tool holder is not used, whereas switch 104 is used in combination with the spindle speed controller.

FIG. 6 illustrates a side view of the portable attachment 76 in order to show how the individual cam inserts 90 are made available to the operator of the machine for programming purposes. The indexing control 30 moves the indexing chain a finite distance to sequentially place each tool holder in position to be grabbed by the jaws 42 of the transfer arm 40. Each position is identified as a home position and with the individual tool holder in a home position an individual cam insert 90 is available for adjustment through a suitable hole or opening on the side of the portable attachment 76. The adjustment is made by the use of an hexagonal wrench inserted into the opening 100 to thereby rotate the cam insert 90 to the desired position. The nameplate on the side of the opening identifies position one as a skip, position two to increase r.p.m., position three to maintain the same r.p.m., and position four indicating a reduction of r.p.m.

With the cam isert 90 positioned against number four as indicated, the camming surface 92 is rotated into position to thereby energize switch 104. The circuit in connection with FIG. 8 will be explained to indicate how the increase speed command from the numerical controller is modified and changed to indicate a reduced spindle speed signal.

With the cam insert 90 positioned against number one a skip function is energized since there is no tool holder in the appropriate bracket position and hence the indexing control is signaled to continue indexing past the empty tool position. In the number one position the cam insert 90 is positioned to contact switch 102 for controlling the index control 30.

The two functions of speed change and indexing skipping are controllable from a single cam since a review of the operation will show that in the event a tool holder is not located in a given bracket and a skipping operation is energized then the programmed tape associated with the numerical controller 12 will not have a speed change signal associated with that position and hence there will be no signal emanating to otherwise change speed for that tool holder position. The operation of the circuit for skipping a selected tool position will be illustrated in connection with FIG. 10.

Figure 7:
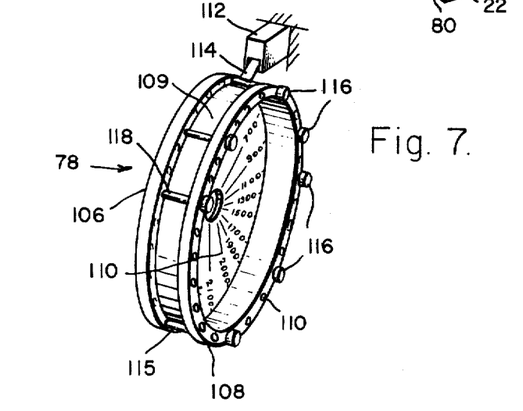
FIG. 7 is a perspective view of the cam assembly located on the spindle speed controller.

Referring now to FIG. 7, there is shown in greater detail the speed cam indicator 78 located on the milling machine 10 and used to indicate the speed that the spindle drive motor is set to. The speed cam indicator 78 consists of a disc portion 106 suitably marked to indicate the speed of the speed change motor. The periphery of the disc 106 contains a shoulder 108 and a plurality of holes 110 aligned with selected indicia on the disc 106 which indicates selected speeds.

A switch 112 is located on the outside portion 109 of the shoulder 108 and is adapted to have its operating arm 114 ride on the outside portion 109 of the shoulder 108. Individual cam members 116 capable of being inserted within holes 110 have camming surfaces 118 adapted to contact and move the operating arm 114 so as to transfer the contacts of the switch 112. The function of switch 112 is to generate a stop signal to the numerical controller 12 whenever the operating arm 114 is contacted by a camming surface 118. The operator in programming the equipment will insert the necessary cams 116 depending upon the speeds of the individual tools used in the tool holders. Further details and operation of the speed change mechanism will be made in connection with FIG. 8.

Figure 8:
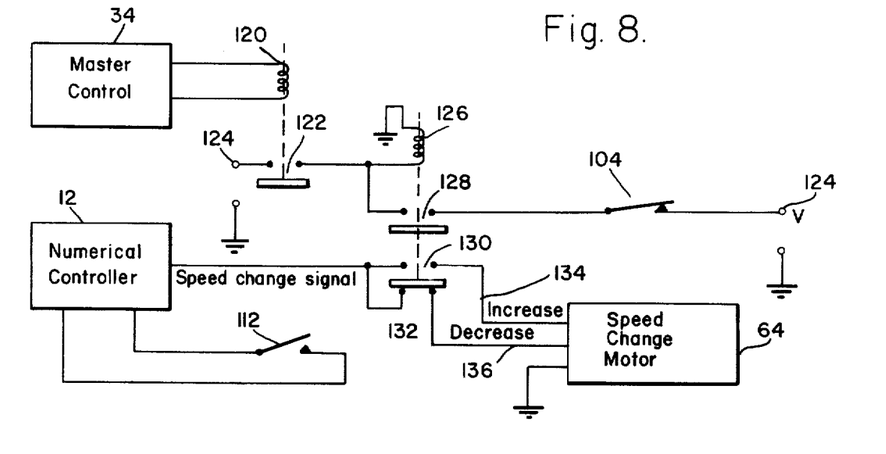
FIG. 8 is a schematic diagram illustrating how a single speed change function is used to indicate either an increase in speed or a decrease in speed.

Referring now to FIG. 8, there is shown a schematic diagram illustrating how a single speed change signal generated by the numerical controller 12 is converted into either an increase speed control or a decrease speed control signal.

At the start of the tool change cycle the master control 34 energizes a relay coil 120 which closes a normally open set of contacts 122. Closing the normally open contacts 122 supplies power from a source 124 which energizes a holding coil 126 operating a pair of normally open contacts 128. The normally opened contacts 128 when closed provide a holding circuit through normally closed switch 104 to a suitable power source 124. Relay 120 is not a holding relay but simply an impulse relay which is momentarily impulsed by the master controller 34 and it is the closing of normally opened contacts 128 that provides the holding circuit for relay 126 through normally closed switch 104.

A review of FIG. 3 will show that switch 104 is the normally closed switch controlled by the position of cam insert 90. By way of review, if the individual tool holder requires a speed increase, then cam insert 90 is positioned so as to have no effect upon switch 104 and hence a flat portion 94 is positioned against diameter 98 thereby allowing the operating arm associated with a switch 104 to pass over without transfering or operating switch 104. This position is indicated in FIG. 6 as position number two which is identified as increase r.p.m.

The tape associated with the numerical controller 12 will therefore be programmed to indicate a tool speed change for that particular position of the tool holder. In other words, switch 104 will stay closed and relay 126 will be energized.

The numerical controller 12 is therefore programmed in advance to generate a speed change signal which is fed to a pair of normally opened contacts 130 and a pair of normally closed contacts 132 associated and controlled by relay 126. With relay 126 the normally opened contacts 130 are closed and the signal from the numerical controller 12 is fed to the increase speed input 134 associated with the speed change motor 64, thereby energizing the speed change motor so as to increase the spindle speed.

With the speed change motor 64 energized the spindle speed will be moved and the speed cam indicator 78 as shown in FIG. 7 will be rotated until the very next cam position 116 contacts the operating arm 114 of switch 112 thereby sending a signal to the numerical controller 12 commanding it to stop sending a speed change signal.

In view of the plurality of cams 116 used in connection with the different speeds required by the individual tool holders, it is very possible that the next cam 116 in sequence is not the selected speed for the tool holder located in the spindle but rather the selected speed for a different tool holder and hence this fact is anticipated in the programming of the numerical controller 12. Assuming there are two cams 116 in position before the desired cam 116 is reached indicating the proper speed for the tool, then the numerical controller will be programmed to again send out a speed change signal which will have the effect of advancing the indicated speed to the next cam 116 which will signal a stop and the process will be repeated a second time in that another speed change signal will be generated by the numerical controller 12 thereby bringing the speed of the spindle to the desired indicated speed as determined by cam 116. The repetitive nature of sequentially advancing the speed control to the desired speed allows the use of a numerical controller 12 having a limited capacity for generating command functions. It will be appreciated therefore that the numerical controller need only generate a speed change signal and that the position of the cam inserts 90 in combination with the cam 116 located on the dial indicator allow a wide variety of different speed settings to be used even though the numerical controller can only generate a single change speed command.

A decrease speed signal is effected whenever cam insert 90 is positioned with the flat portion 94 located away from the diameter 98 thereby causing normally closed switch 104 to be transferred by cam surface 92 which thereby prevents relay 126 from being held in a transferred position.

The numerical controller 12 will therefore generate a speed change signal which will pass through normally closed contact 132 and energize decrease speed input line associated with the speed change motor 64. Speed change motor 64 will therefore operate in the reverse direction, decreasing the speed of the spindle drive until a cam 116 transfers the stop motor cam 112 signaling the numerical controller 12 to stop generating a speed change signal. The process will repeat itself depending on the programmed speed desired as mentioned previously.

It is interesting to note that for the situation where the tool in the associated tool holder is running at the same speed as the previous tool that it was necessary to provide a position three as indicated in FIG. 6 identified as same r.p.m. This position actually has no effect on switch 104 since the numerical controller 12 is programmed in advance not to generate a speed change function where no speed change is required and hence there will be no signal appearing from the numerical controller 12 to operate the speed change motor 64. It was found necessary to add position three in order to satisfy the requirements of the machine tool operators who felt that it was necessary for completeness to identify that position requiring the same r.p.m. even though the position has no effect on the operation of the machine. The four positions indicated in FIG. 6 require the operator to adjust each cam 90 for every tool position and therefore it does provide a specific positional control for each of the tool holder positions.

FIG. 6 provides another alternative for the adjustment of cam 90 which is to allow the indexing control to continue indexing in the presence of a tool holder position that is not being used. Normally an empty tool holder position would be programmed in advance by the numerical controller and a command signal would be generated indicating to the indexing mechanism that the tool is not being used and that the indexing mechanism should continue, however, in the interest of again utilizing a more simplified numerical controller with a minimum of command positions, the same functions of skipping a tool holder position that is not being used is built in and obtained by the transferring of switch 102 as illustrated in connection with FIG. 3

As indicated in FIG. 6, cam 90 is rotated to the first position which thereby places camming surface 92 in a position to operate switch 102 which thereby prevents the indexing operation.

A review of the operation of cam 90 will show that in order to achieve continous skipping, it is necessary that the flat portion 94a be facing switch 102 in order that switch 102 is not transferred. In this position there is no tool change signal and hence the position of the flats operating switch 104 is immaterial and has no effect.

The converse, however, is not true since it is necessary that the indexing operation be stopped when a speed change function is energized whether it be an increasing command or a decreasing speed command. It is essential therefore that camming surface 94A be in a position to transfer switch 102 whenever a speed change function is desired and hence the flat 94 operating switch 104 must be located either orthagonal or opposite the flat operating switch 102 which commands an indexing or skipping operation. The circuit controlling the indexing operation will be explained in connection with FIG. 10.

Figure 9:
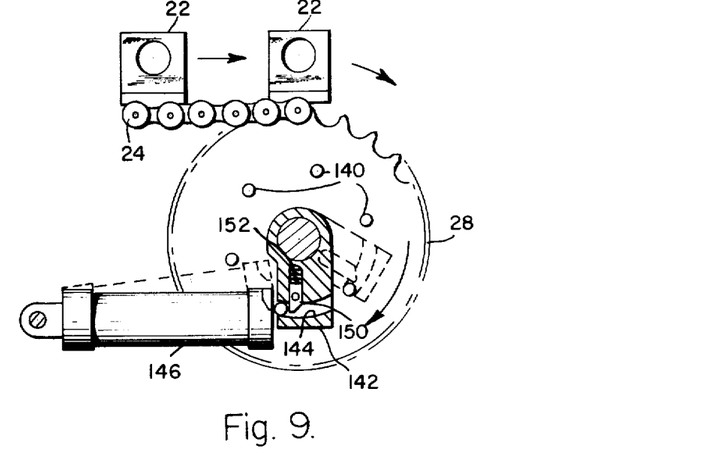
FIG. 9 illustrates the indexing control moving the endless chain and the tool holders.

Referring now to FIG. 9, there is shown an indexing mechansim for controlling the rotation of sprocket 28. As mentioned previously, sprocket 28 engages and drives the indexing chain 24 carrying the individual brackets 22.

The embodiment described utilizes 12 holders 22 and hence there are located six pins 140 projecting from the underside sprocket 28. Also located on the other side of sprocket 28 is a bracket assembly 142 mounted on the same shaft as sprocket 28 but otherwise free to move independently of the sprocket wheel 28. A bracket 142 contains an arcuate cutout 144 for allowing each of the pins 140 to pass through and around without interference.

A cylinder 146 is pivotably attached at one end 148 to a base member and to the other end a piston assembly associated with cylinder 146 is pivotably attached to bracket 142 thereby allowing the bracket to assume an open position with the piston fully extended and a closed position with the piston fully closed. A ratchet assembly comprising a ratchet member 150 and a spring 152 is radially located within the bracket 142 is such a manner as to allow ratcher 152 to be cammed radially towards the center in the presence of a pin 140 but to be held firmly in place against a pin 140 with the piston holding the bracket 142 in a closed position.

The indexing operation therefore comprises energizing the cylinder 146 which pushes the bracket 142 into the open position and allows ratchet 150 to be cammed out of the way by the position of pin 140. Energizing the cylinder 146 pulls the piston in to a closed position thereby causing the ratchet 150 located on the bracket 142 to push the pin 140 thereby indexing and holding the sprocket wheel 28.

Figure 10:
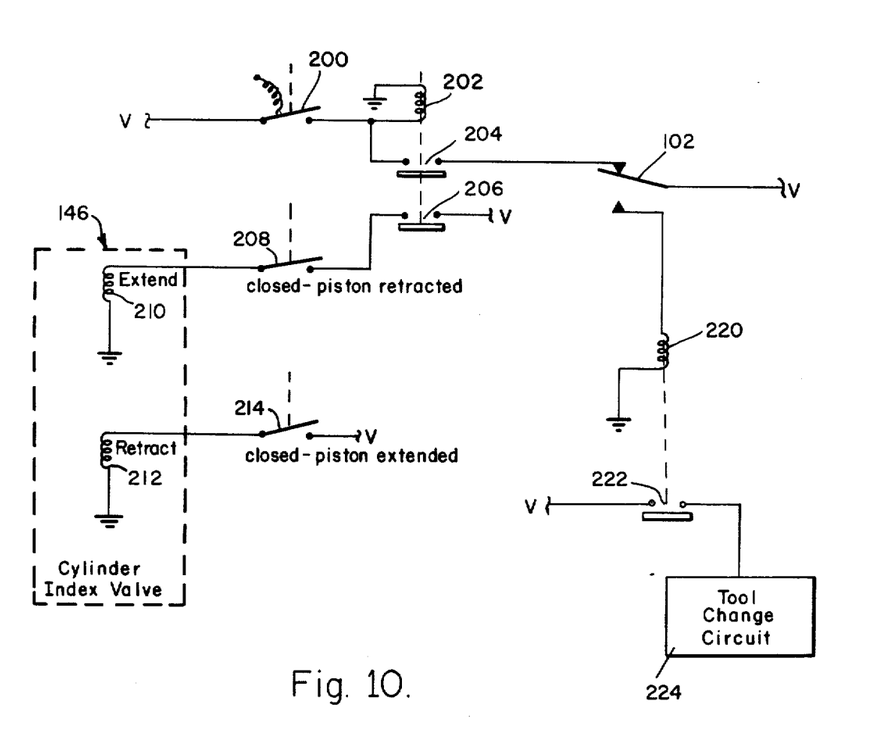
FIG. 10 is a schematic diagram illustrating the skip function for allowing the index means to continuously operate in the absence of a tool holder in any given position.

Referring now to FIG. 10, there is shown a simplified schematic drawing which illustrates the indexing mechanism and how the transfer of switch 102 by the appropriately positioned cam 90 in the cam turret 82 is used to stop the indexing control in the presence of a tool holder to be selected by the transfer arm 4.

A momentary close switch 200 responsive to a tool change command signal is connected in series with relay 202 that operates a pair of normally opened contacts 204 and 206. Contracts 204 are connected in series with the holding coil 202 through the normally closed portion of contacts associated with switch 102. It should be remembered that while there is only a single switch 102 there are in effect 12 separately operable cams 90 capable of repositioning switch 102 for each position of the associated tool holder. The position of switch 102 is the normal position with the operating arm of the switch located on a flat 94a associated with the rotatable cam 90. The position indicated is also identified in FIG. 6 as position one identified as the skip position meaning the index control 30 will be energized to provide continuous indexing in the absence of a tool holder in that position.

The momentary closing of switch 200 will immediately energize coil 202 and close normally open contacts 204 thereby completing the holding circuit for coil 202 through the normally closed contacts of switch 102. The normally closed contacts 206 are connected in series from a power source to a limit switch 208 connecting an extend coil associated with the index valve controlling cylinder 146.

The retract coil 212 associated with cylinder 146 index valve is controlled by a limit switch 214 connected to a source of power.

Limit switch 208 is closed whenever the piston associated with the cylinder 148 is in the retracted position whereas limit switch 214 is operated whenever the piston associated with the cylinder 146 is in the extended position.

In operation the holding of coil 202 through the normally closed switch contacts of 101 cause the normally open contacts 206 associated with coil 202 to close. With the piston of cylinder 146 in the retracted position, switch 208 will be closed and coil 212 will be energized thereby extending the piston to the position indicated by the dotted lines in FIG. 9. This act will cause switch 208 to open and cause limit switch 212 to close. Closing of switch 214 immediately supplies power to operate relay 212 thereby energizing piston 146 causing the pawl 150 located on arm 142 to push against one of the pins 140 thereby indexing the ratchet wheel 28. Moving the ratchet wheel 28 as shown in FIG. 3 will rotate right angle gears 88 and 86 causing the cam assembly 82 to rotate thereby placing the next cam insert 90 in position to control switch 102.

If the very next tool holder is missing then the cam insert 90 will be selected for position one, meaning that a flat 94a will be facing switch 102 thurby leaving switch 102 thereby leaving switch 102 in the position illustrated in FIG. 10 and hence the indexing mechanism will continue as just described.

In the event the very next position is occupied by a tool holder 22 then the cam insert 90 will have been rotated to either position two, three or four as illustrated in FIG. 6. In all of these positions the camming surface 92 will be in position to operate and transfer switch 102 thereby causing the operating arm associated with switch 102 to transfer into the normally open position.

The normally open position of switch 102 is connected to relay 220 which operates a pair of normally open contacts 222 which connects a source of power to the tool change circuit 224 located within the master control 34.

A review of the circuit will show that with cam insert 90 in either position two, three or four, that switch 102 will be transferred thereby opening the normally closed portion and energizing the normally opened portion. Opening the normally closed portion of switch 102 prevents index relay 202 from being held in the closed position thereby preventing initiation of the indexing mechanism.

The normally opened contacts of switch 102 now being closed is in a position to apply power directly to relay 220 which energizes the tool change circuit 224 and allows the master control 34 to proceed with the selecting and transferring of the tool holder 20 from bracket 22 for insertion into the machine spindle 16 located on the milling machine 10.

I claim:
1. In a machine tool having a machine tool spindle adapted to be driven at various speeds the combination comprising a plurality of sequentially attached tool holding stations,
   each of said tool holding stations adapted to hold a tool holder,
   indexing means for indexing said tool holding stations past a given home position,
   a single cam assembly comprising a rotary drum having a plurality of settable cams, one for each tool holder located along the periphery of said drum and driven by said indexing means in time sequence with said holding stations, each settable cam having two separate camming surfaces for contacting two separate switch means,
   a numerical controller adapted to generate a tool speed change signal and in which one of said cams controls a first switch means for generating a first signal to change the tool spindle speed in a given direction said spindle speed being appropriate for each said tool holder.

2. In a machine tool having a machine tool spindle adapted to be driven at various speeds the combination comprising.
   a plurality of sequentially attached tool holding stations,
   each of said tool holding stations adapted to hold a tool holder,
   indexing means for indexing said tool holding stations past a given home position,
   a single cam assembly comprising a plurality of presettable switch controlling means, one for each tool holding station, driven by said indexing means in time sequence with said holding stations,
   a plurality of switch means controlled sequentially by said switch controlling means driven by said index means for generating a plurality of control signals, said plurality of switch means comprising a first switch means for controlling said index means in the absence of a tool holder at a given position and a second switch means for converting an externally generated spindle speed change signal into a specified command for a tool spindle speed change in a given direction.

* * * * *

UNITED STATES PATENT OFFICE
CERTIFICATE OF CORRECTION

Patent No. 3,955,267            Dated May 11, 1976

Inventor(s) David E. deCaussin

It is certified that error appears in the above-identified patent and that said Letters Patent are hereby corrected as shown below:

Column 2, line 26, delete "and".

Column 3, line 52, "se" should read -- set --.

Column 6, line 57, "29" should read -- 20 --.

Column 8, line 47, "isert" should read -- insert --.

Column 9, line 66, before "the" insert -- energized --.

Column 11, line 64, "is", second occurrence, should read -- in --.

Column 12, line 67, delete "thereby leaving switch 102".

Signed and Sealed this

Twenty-eighth Day of December 1976

[SEAL]

Attest:

RUTH C. MASON
*Attesting Officer*

C. MARSHALL DANN
*Commissioner of Patents and Trademarks*